Jan. 30, 1951     A. F. KLINZING     2,539,785
STOCK WATERING FOUNTAIN
Filed Feb. 4, 1950
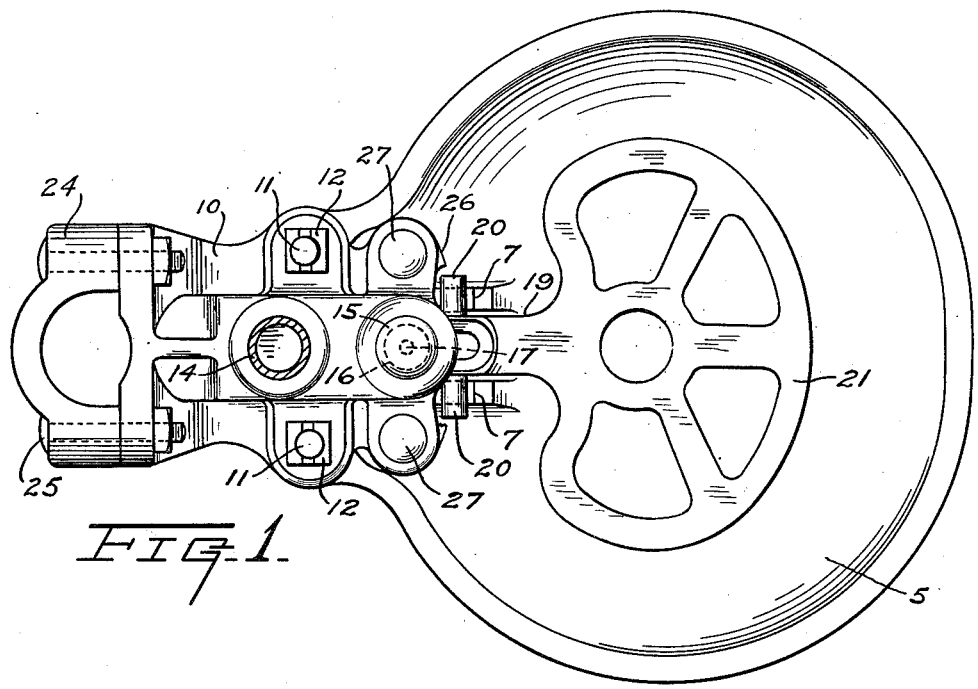
FIG. 1.
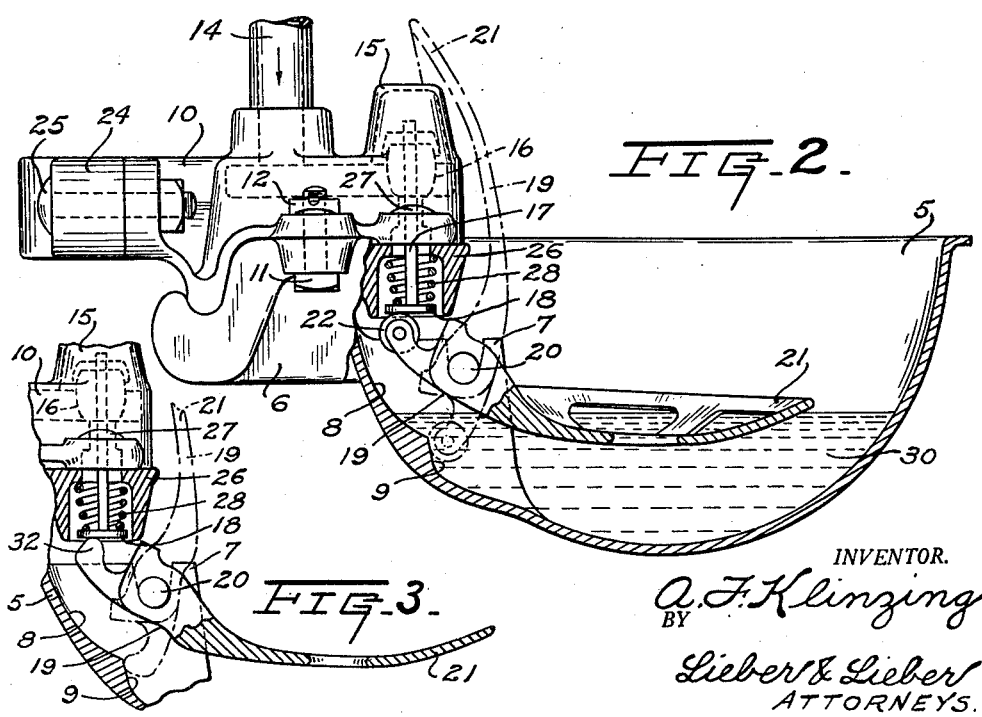
FIG. 2.
FIG. 3.
INVENTOR.
A. F. Klinzing
BY
Lieber & Lieber
ATTORNEYS.

Patented Jan. 30, 1951

2,539,785

UNITED STATES PATENT OFFICE 2,539,785

STOCK WATERING FOUNTAIN

August F. Klinzing, Milwaukee, Wis.

Application February 4, 1950, Serial No. 142,447

3 Claims. (Cl. 119—75)

The present invention relates in general to improvements in the construction and operation of mechanical stock watering devices, and relates more particularly to improvements in the control mechanism for supplying fresh liquid to the drinking bowls of animal actuated fountains or the like.

The primary object of my present invention is to provide an improved animal actuated mechanical drinking fountain for cattle and the like, which is simple and compact in construction and highly effective in use.

It has long been almost universal practice to provide various types of animal actuated drinking fountains for supplying fresh water to cattle and other stock, and most of these fountains are provided with a supply valve operable by means of a nose actuated plate or lever disposed within the liquid confining bowl, whereby the animals themselves can obtain a fresh supply of water at will, by merely depressing the valve actuator. When these fountains are in normal use, the nose actuated plates or levers thereof should be disposed within their carrying bowls so that the anmials can readily actuate the water supply valves, but it is also often desirable to make the liquid supply units inactive so that no accidental or undesirable discharge of water will take place. While it has heretofore been proposed to provide a special latch pin carried by the nose plate of such a fountain and adapted to engage the liquid supply valve casing when the plate is swung upwardly out of the bowl so as to hold the valve actuator in inactive position, this prior latching device is relatively complicated and unreliable due to the fact that the latch pin frequently corrodes and prevents the nose plate from being lowered into active position without great difficulty.

It is therefore an important object of the present invention to provide an improved stock watering fountain of the nose plate or lever actuated type, wherein the nose plate may be quickly and conveniently disposed either in active or inactive position and effectively retained in either of these two alternative positions.

Another important object of this invention is to provide an improved liquid supply valve actuator for animal drinking bowls, which may be disposed in inactive position without danger of being returned to active position by the nosy animals, but which can be readily returned to active position by the attendant.

A further important object of the invention is to provide an improved bowl and nose plate assemblage for automatic stock water supply fountains, wherein the nose actuated plate is not removable by the animals but may be either removed or re-applied by the attendant, or it may merely be swung from active into inactive position and vice versa and is automatically confined in such positions.

Still another object of my invention is to provide an improved water supply valve operating lever for animal actuated drinking units, which is exceedingly reliable in operation but cannot be removed by the drinking animals.

An additional object of the present invention is to provide a highly effective stock watering fountain which is flexible in its adaptations and uses, and all parts of which are conveniently accessible for inspection and cleaning while also being formed for easy assembling and dismantling by the owners.

These and other objects and advantages of the invention will be apparent from the following detailed description.

A clear conception of the improved features which constitute my present invention, and of the construction and operation of several typical nose actuated drinking fountains embodying the same, may be had by referring to the drawing accompanying and forming a part of this specification wherein like reference characters designate the same or similar parts in the various views.

Fig. 1 is a top view of a typical stock watering fountain unit embodying the invention;

Fig. 2 is a partial vertical section and part side view of the fountain unit shown in Fig. 1 having the valve actuating lever or nose plate thereof provided with an anti-friction roller; and Fig. 3 is a fragmentary sectional view similar to that of Fig. 2, but with portions omitted for clarity and showing a modified type of valve actuating lever or nose plate devoid of the anti-friction roller.

The primary feature of the present invention as distinguished from my prior Patent No. 2,476,876, granted July 19, 1949, is the provision of means for automatically holding the nose plate lever in inactive position when it is swung out of the bowl, and while only two typical units embodying the improvement have been shown and described herein, it is not my desire or intention to unnecessarily restrict its utility by virtue of this limited showing; and it is also contemplated that specific descriptive terms employed herein be given the broadest possible interpretation consistent with the disclosure.

Referring to Figs. 1 and 2 of the drawing, the typical improved stock watering fountain illustrated therein, comprises in general a water receptacle or bowl 5 having a rear integral mounting portion 6 and being provided near this portion with a pair of laterally spaced upwardly open saddles 7 and with a cam surface 8 and an abutment surface 9 disposed rearwardly of and between the two saddles 7; a fresh liquid supply and bowl suspension casing 10 detachably secured to the bowl portion 6 by means of bolts 11 and special lock nuts 12, and being provided with a water supply pipe 14 and with a control valve housing 15 projecting forwardly above the saddles 7; a flow control valve 16 confined within the housing 15 and having a depending operating stem 17 provided with a flat disc 18 at its lower end near the saddles 7; and a nose actuable lever 19 swingably suspended at its medial portion within the saddles 7 by means of pivot pins 20, and having a front dish shaped nose contact plate 21 located above the bottom of the bowl 5 while its rear end portion is provided with an anti-friction roller 22 alternately engageable with the valve stem disc 18 and with the cam and abutment surfaces 8, 9.

The liquid confining and mounting portions of the bowl 5 together with the cam and abutment portions and the saddles 7, may all be formed of a single unitary casting of relatively non-corrosive metal or coated with such material; and the liquid supply casing 10 and valve housing 15 may be likewise constructed. A clamping bracket 24 may also be secured to the rear of the casing 10 by bolts 25 in order to effect attachment of the unit to a post or other support. The flow control valve 16 is cooperable with a seat formed on a detachable hollow fitting 26 secured by bolts 27 or otherwise, to the valve housing 15; and a helical compression spring 28 surrounding the valve stem 17 and coacting with the disc 18 and with the fitting 26, tends to constantly urge the valve 16 into closed position. The lower surface of the disc 18 is preferably flat and smooth, and this disc is confined within the fitting 26 and is thus protected against damage.

The nose actuable lever 19 and its integral pivot pins 20 may likewise be formed of or coated with rust resistant metal, and this lever is normally disposed in approximately horizontal active position as illustrated in solid lines in Figs. 1 and 2. The anti-friction roller 22 is journalled for free rotation in the rear end of the rigid lever 19 and normally engages the smooth lower face of the disc 18, and the pivot pins 20 normally rest by gravity within the upwardly open sockets or saddles 7 while the roller is held in direct contact with the disc 18 by the weight of the nose portion 21 of the lever 19. This lever 19 can only be bodily removed from the saddles 7 by releasing the bolts 11 and nuts 12, but may be displaced from within the bowl 5 by merely swinging it upwardly about the pins 20 to approximately upright position, and the lugs projecting upwardly from above the pivot pins 20 will engage the bottom of the fitting 26 so as to prevent the animals from lifting the lever out of the sockets or saddles.

The cam surface 8 which is formed on the interior of the bowl 5 beneath the liquid supply valve 16 and between the saddles 7 is longitudinally curved as shown so as to gradually diminish the distance between this surface and the bottoms of the saddle sockets, and the lower end of the surface 8 terminates at and merges with the abutment surface 9. This abutment surface provides an abrupt drop-off or ledge extending downwardly away from the saddles 7 and is also located therebetween; and when the nose lever 19 is tilted upwardly so as to cause the roller 22 to contact and ride downwardly along the cam surface 8, the pins 20 will initially be gradually elevated within the saddle sockets until the roller rides over the lower end of the cam surface 8, whereupon the lever 9 will have assumed approximately upright position as illustrated in dot-and-dash lines in Fig. 2, and will finally drop until the pins 20 again rest in the bottoms of the saddles 7. The nose lever will then be firmly held in upright inactive position with the portion 21 closely adjacent to the valve housing 15 while the roller 22 will snugly engage the abutment surface so as to firmly hold the lever 19 in inactive dot-and-dash position. In order to thereafter restore the nose lever 19 to active position, it is only necessary to lift the same slightly above the abutment surface 9 and to subsequently swing it forwardly and downwardly.

The modified stock watering unit illustrated in Fig. 3 is quite similar to that of Figs. 1 and 2, except that the anti-friction roller 22 has been omitted from the lever 19 and the rear end 32 of this lever has been formed for direct rolling and sliding contact with the supply valve actuating disc 18 and with the cam surface 8. While this construction introduces slight friction between the lever end 32 and the surfaces with which it cooperates, the simplified structure is less complicated and costly, and functions in the same manner to either actuate the supply valve 16, to permit bodily removal of the lever 19, or to effect inactive disposition and holding of this nose lever. When the modified lever 19 is placed into inactive approximately upright position as shown in dot-and-dash lines, the rounded end 32 thereof engages the abutment surface 9 to firmly hold this lever inactive; and in both of the typical units illustrated, the animals are able to obtain their own supply of fresh water 30 by merely depressing the nose portion 21 of the lever 19 so as to open the valve 16, whereas release of the nose piece will cause the spring 28 to automatically close the liquid supply valve.

From the foregoing detailed description of the construction and operation of several commercial embodiments of the invention, it should be apparent that I have provided an improved stock watering fountain wherein the nose actuated liquid supply valve operating lever 19 may be conveniently moved from active to inactive position, and vice versa, and effectively retained in either of these two positions without introducing complicated structure which is apt to bind or stick. The improved lever latch functions without interferring with the normal operation of the fountain valve mechanism and without obstructing the usual bodily removability of the nose lever, and because of its simplicity this latching device may be readily applied to various types of fountain bowls 5 at practically no additional cost. The improvement has proven highly satisfactory and successful in actual use, and when the lever 19 has been placed in upright inactive position the water supply valve 16 is effectively protected against opening, aand the lever is firmly held in such position and cannot be restored to active position by the animals, but may be quickly and easily restored by an attendant. The upper projections formed on the nose lever near the valve fitting 26, coact with this fitting to prevent the lever from being entirely withdrawn from the saddles 7 during swinging of this lever from horizontal to vertical position and vice versa, while still permitting the pivots 20 to move vertically within these saddles as the end of the nose lever rides over the cam surface 8, and the nose lever can only be bodily removed from the unit by withdrawing the bolts 11.

It should be understood that it is not desired to limit this invention to the exact details of construction and operation of the specific fountains herein shown and described, for various modifications within the scope of the appended claims may occur to persons skilled in the art.

I claim:

1. A stock watering fountain comprising, a liquid confining bowl having therein upwardly open saddles and a cam surface terminating at an upright abutment, a valve for delivering fresh liquid to said bowl, and a nose actuable valve operating lever normally pivotally confined within said saddles in approximately horizontal position, one end of said lever normally coacting with said valve to admit liquid to said bowl but being initially cooperable with said cam surface to lift the lever within said saddles when the opposite lever end is swung upwardly and thereafter coacting with said abutment to finally position the first mentioned lever end against said abutment to lock said lever in inactive upright position.

2. A stock watering fountain comprising, a liquid confing bowl having therein spaced saddles and a forwardly and downwardly inclined cam surface terminating at an upright abutment between the saddles, a valve disposed rearwardly of said saddles for delivering water to said bowl, and a nose actuable valve operating lever having its medial portion pivotally supported within said saddles and normally being disposed in approximately horizontal position, the rear end of said lever normally coacting with said valve to admit water to the bowl but being cooperable with said cam surface when the front end of the lever is swung upwardly out of normal position to lift the lever bodily within said saddles, and said rear lever end being automatically engageable with said abutment by gravity to lock the lever in upright position when said end has travelled forwardly beyond said surface.

3. A stock watering fountain comprising, a liquid confining bowl having therein spaced saddles and a forwardly and downwardly inclined cam surface terminating at upright abutment between the saddles, a valve disposed rearwardly of said saddles for delivering water to said bowl, a nose actuable valve operating lever having its medial portion pivotally supported within said saddles and normally being disposed in approximately horizontal position, and an anti-friction roller carried by the rear end of said lever and normally coacting with said valve to admit water to the bowl but being rollable along said cam surface when the front end of the lever is swung upwardly away from normal position to lift the lever bodily within said saddles, and said roller being automatically engageable with said abutment by gravity to lock the lever in upright position when it has travelled forwardly beyond said surface.

AUGUST F. KLINZING.

REFERENCES CITED

The following references are of record in the file of this patent:

UNITED STATES PATENTS

| Number | Name | Date |
|---|---|---|
| 1,296,586 | Louden | Mar. 4, 1919 |
| 1,416,936 | Bogda | May 23, 1922 |
| 1,590,015 | Gardner | June 22, 1926 |

FOREIGN PATENTS

| Number | Country | Date |
|---|---|---|
| 247,355 | Great Britain | Feb. 18, 1926 |
| 322,591 | Great Britain | Dec. 12, 1929 |